Patented July 1, 1947

2,423,261

UNITED STATES PATENT OFFICE 2,423,261

GERMICIDAL PRODUCT AND METHOD OF PRODUCING SAME

Frank J. Sowa, Cranford, N. J.

No Drawing. Application June 4, 1943,
Serial No. 489,707

1 Claim. (Cl. 117—138.5)

This application is a continuation in part of my co-pending application Serial No. 443,304, filed May 16, 1942, and relates particularly to compositions and methods whereby materials may be rendered permanently bacteristatic, fungistatic, or germicidal, and to the products produced by such methods.

Germicides for use in the treatment of textiles, fibers, paper, leather, and other materials should be characterized by a number of important properties which are difficult to attain. The most important of these are high toxicity to fungi and bacteria in low concentrations, together with low solubility or permanence in or on the material treated therewith. In order to be capable of practical and extensive use it is also necessary that the germicide be easily applied to the materials treated, that it be non-irritating to the skin, fast to sunlight, chemically stable and free from any tendency to discolor, weaken or otherwise injure the materials treated therewith.

Diaryl mercury compounds such as diphenyl mercury and dibenzyl mercury are compounds which possess the desired high toxicity to bacteria and fungi and since they are extremely stable and practically insoluble in ordinary solvents their use in the treatment of fabrics, leather, paper and in the formation of sheets, films, coating compositions and the like would be highly desirable. However, the very insolubility of diaryl mercury compounds and the difficulties involved in their production have heretofore precluded their use as germicide, fungicide or mildew preventing agents.

Applicant has now discovered very simple and relatively inexpensive methods for the production of diaryl mercury compounds and also has developed methods whereby these compounds can be formed in situ in and on fabrics, leather, paper, and the like so as to render such products permanently germicidal, bacteristatic, fungistatic and mildew resistant.

In accordance with the present invention well known and readily available organic mercury compounds are used as starting materials to produce new compositions which are completely or readily soluble in water so that they may be easily applied to materials in the desired concentration and by simple operations which do not require the use of expensive or dangerous solvents or equipment other than that ordinarily employed in the industry. It is therefore possible to produce the most effective penetration or application of the soluble mercury composition into or on fabrics, leather and the like and to produce substantially uniform distribution thereof throughout or admixture thereof with materials to be treated. The water soluble composition, after penetration into the fibers of the material or after application to or admixture therewith, is converted in situ, to the insoluble diaryl mercury compound so that the treated product is rendered bacteristatic and fungistatic and retains these properties so as to be remarkably "permanent" to laundering and similar conditions to which the materials may be subjected.

One of the most important practical advantages of the present invention resides in the fact that the conversion of the soluble mercury composition to the almost completely insoluble diaryl mercury compounds may be effected simply by moderate heating of a water solution of the soluble mercury composition. In fact diaryl mercury compounds tend to form spontaneously at room temperatures and to precipitate from such solutions if inhibitors are not employed. In most instances therefore an inhibitor is added to water solutions of the soluble mercury composition to facilitate the application thereof to materials and the material is thereafter heated to overcome the effect of the inhibitor and produce the diaryl mercury in situ after application to the product to be treated.

The principal object of the present invention is to provide novel methods and means for rendering materials such as textiles, fibers, yarns, paper, leather, films, sheets and the like substantially permanently germicidal, bacteristatic or fungistatic.

Another object of the invention is to provide novel means for introducing diaryl mercury compounds into and through or onto materials to render them bacteristatic and fungistatic.

A further object of the invention is to provide new bacteristatic and fungistatic products.

These and other objects and features of the present invention will appear from the following detailed description thereof in which typical examples are cited to indicate the nature of the invention and preferred compositions and practices in accordance therewith but without intending to limit the scope of the invention thereby.

As pointed out more fully in the co-pending application of which this application is a continuation-in-part, it has been discovered that organic mercury compounds having the general formula R—Hg—X, in which R is an alicyclic, aromatic or heterocyclic ring structure and X is a hydroxyl group or an anion of an inorganic or organic acid, are capable of forming water soluble addition products by reaction with water soluble hydroxy alkyl amines. The organic mercury hydroxides and organic mercury salts of nitric, sulfuric, phosphoric, acetic, citric, butyric, lactic and malic acids are typical of those which may be employed in the present invention. Specific representative examples of these salts are phenyl mercuric acetate, phenyl mercuric lactate, phenyl mercuric hydroxide, tolyl mercuric malate and tolyl mercuric butyrate. Among the hydroxy alkyl amines which may be used to form water soluble addition products in accordance with the present invention may be mentioned the mono- di- and tri-ethanol amines and mono-isopropanol amine.

In the case of phenyl mercuric acetate and triethanolamine, which are preferred materials used in the practice of the present invention, the reaction by which the water soluble addition composition is produced, may be represented as follows:

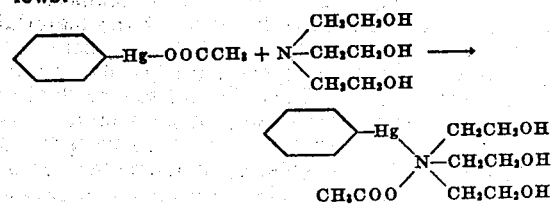

This composition may be produced by simply dissolving phenyl mercuric acetate in a mixture of triethanolamine and water at room temperature or with moderate heating. The resulting reaction is exothermic and results in the formation of a mushy, nearly white product of waxy-crystalline character. This composition has a melting point of approximately 75° C. and is much more soluble in water and alcohol and much less soluble in hot benzene than is phenyl mercuric acetate.

On standing at room temperature, and more rapidly on moderately heating, a water solution of this new composition spontaneously decomposes to precipitate the substantially insoluble diphenyl mercury as a grayish-white crystalline precipitate which when isolated and washed with water is found to melt at 122° C. The reaction which produces the diphenyl mercury is believed to be as follows:

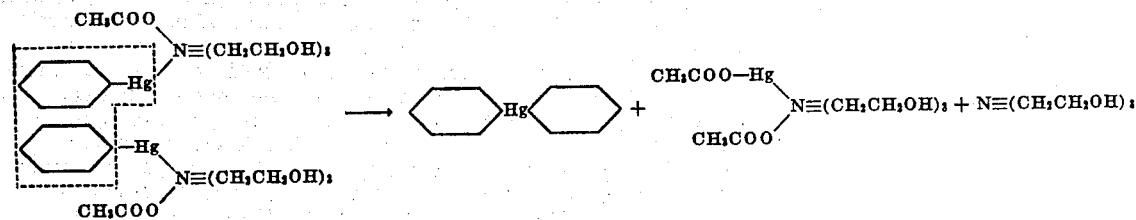

The diphenyl mercury which precipitates has marked germicidal and fungicidal properties and in accordance with the present invention it is used to render materials bacteristatic, fungistatic or germicidal. The reaction products other than diphenyl mercury are water soluble and may be washed from the treated material or recovered for use.

Precipitates of diphenyl mercury, dibenzyl mercury and the like are obtained when using other organic mercury salts and other hydroxy alkyl amines in producing the water soluble addition product. It is therefore evident that various diaryl mercury compounds may be used in the practice of the present invention. Moreover, these compounds, although substantially insoluble are readily produced from water soluble mercury-containing addition products of hydroxy alkyl amines. Furthermore, the insoluble germicidal material may be formed in situ on or in the fibers, pores or body of textiles, yarns, paper, leather and other porous materials or on or in the body of paints, sheets, films or other forms and types of non-porous materials.

The water soluble mercury composition may be mixed with or dissolved in other materials used in treating fabrics or the like or for coating or finishing products and thus may be added to textile finishes, water proofing or water repelling materials, dye baths, fire proofing agents, or to emulsions, solutions or mixes of a great variety of substances.

In order further to indicate the nature and application of the present invention the following typical examples are cited by way of illustration and not by way of limitation.

*Example I*

1500 grams of phenyl mercuric acetate are mixed with 3750 cc. of triethanolamine and 500 cc. of 80% lactic acid. The resulting mushy mass is the water soluble addition product described above. This mercury composition is thereafter diluted with water to make a total of 5 gallons and 25 grams of citric acid dissolved in a little water are added to the batch. This is the solution used in the present and succeeding examples for addition to textile treating baths, paints and the like. The lactic and citric acid may be omitted in preparing the solution if it is to be used promptly. However, they are generally added since they function as inhibitors to prevent or delay spontaneous formation of diphenyl mercury and its precipitation from the solution. Other organic acids and even various salts may be used as inhibitors, notably acetic acid and the salts of acetic acid such as sodium acetate.

A textile treating bath is prepared by adding the above solution of the soluble mercury-containing addition composition to water in the amount of 17 grams of the solution to each gallon of water in the bath. The bath then contains the equivalent of about 1 part of phenyl mercuric acetate to 250,000 parts of water.

Cotton fabric is passed through the bath thus produced and is run wet to squeeze rolls adjusted to leave an amount of liquid in the fabric equal to the dry weight of the fabric. In other words, the fabric is said to have "100% pick up." The fabric is then dried at about 225° F. on calender rolls or a tenter frame running through an oven, or in any other suitable way, whereupon diphenyl mercury is formed in situ on and within the fibers of the fabric. After drying or heating the fabric may be washed to remove water soluble materials and when again dried it is found that the weight of the fabric is increased by an amount equal to .45% of its original dry weight.

The treated fabric is effectively and permanently bacteristatic and fungistatic and will withstand repeated laundering without material reduction in these properties. Furthermore, the treatment does not alter the appearance, color, tensile strength or other properties of the fabric and the fabric may be worn next to the skin or in any other manner without irritation or danger of injury to the user.

When treating fabrics which are not wet easily or which do not pick up and hold 100% of their weight of liquid when treated as described above, the concentration of the solution of water soluble mercury composition in the bath may be increased to give the desired increase in weight of the finished dried fabric. For most purposes this increase in weight should be about .45% but the weight increase may be as low as .2% or as high as 1.0% depending upon the conditions to which the fabric will be subjected in use.

The treatment of silk or wool materials in accordance with the present invention may be carried out substantially as described in Example I but it is found that these materials tend to discharge the bath so that the material first run through the bath will take up the germicidal material reducing the concentration thereof in the bath. Under these circumstances successive or continual additions of the solution of soluble mercury compositions to the bath should be made to obtain uniformity in the increase in weight of the finished product—that is a uniform increase of about .45% of the weight of the dry fabric treated.

In the alternative the concentration of the bath may be adjusted to produce a final product having the minimum weight increase necessary to render all of the fabric effectively bacteristatic and fungistatic.

Example II

A water repellent fabric which is bacteristatic and fungistatic may be produced by dissolving or dispersing a water repellent agent in the textile treating bath. For this purpose an aluminum acetate-wax emulsion type of water repellent is added to the bath to equal about 8% thereof. A solution of the water soluble mercury composition produced as described in Example I is added to the bath in amount equal to 17 grams of solution to each gallon of the bath and is mixed thoroughly therein so as to be distributed uniformly with the water repellent emulsion.

The bath is then padded onto the fabric or the fabric is run through the bath and through squeeze rolls to provide the desired "pick up" to insure a weight increase due to the germicidal agent which is equal to about .45% to .5%. The material is then dried by heating to a temperature of about 220° F. so as to form the precipitate of diphenyl mercury in situ in and on the treated fabric.

Example III

A 65% solution of urea formaldehyde resin, such as dimethylol urea, is added to water to produce a textile finishing bath containing 3% of the resin. An amount of the solution of water soluble mercury composition described in Example I equal to 17 grams per gallon, is added to the bath and fabric is passed through the bath. It then passes to squeeze rolls adjusted to provide "100% pick up" and is thereafter dried by heating to a temperature of about 225° F. The textile finish is thus applied to the fabric while the insoluble germicidal compound is precipitated in situ to form a bacteristatic and fungistatic product.

Example IV 17 grams of the solution prepared in Example I are added to each gallon of water used to form a spray which is applied by an air blast or otherwise to paper, leather, fabric, paint, sheets, films, or the like, and the treated material is dried by moderately heating the same to precipitate diphenyl mercury therein and thereon, to render the product permanently germicidal and fungicidal and mildew resistant.

In place of the solution of the particular water soluble mercury composition described in Example I and used in Examples I to IV, solutions of similar composition may be employed. Such alternative composition may be produced by dissolving phenyl mercuric lactate in triethanolamine and water, or by dissolving phenyl mercuric nitrate in water and mono-isopropanol amine, or by dissolving tolyl mercuric butyrate in water and triethanolamine. In each instance a water soluble addition compound is produced for use in the present invention. Each of these solutions produces an almost completely insoluble diaryl mercury compound on long standing or on heating thereof. Drying or heating of the material to precipitate the diaryl mercury compound therein may be effected by any suitable means and at temperatures up to say 350° F. or higher, provided the textile or other material is not injured by such heating thereof. In general, when using resins and similar synthetic finishing materials the use of higher temperatures is preferred.

The invention is not only applicable in treating textiles, yarns, threads, and fabrics formed of natural fibers, but is also used in treating materials formed of or containing synthetic fibers or substances such as viscose, rayon, rubber, resins and the like. The precipitation of the diaryl mercury compound will take place within the material to the extent of penetration of the soluble mercury composition on or in those portions of the material with which it is mixed. Penetration of synthetic fibers may be increased by treating the material under pressure if desired.

It will thus be apparent that the present invention is of very general application and the composition and methods of applying and using organic mercury salts, compositions, and compounds to render products bacteriostatic and fungistatic are capable of wide variation. In view thereof it should be understood that the invention is not limited by the examples cited or by the compositions and procedures specifically mentioned and described above since these have been given to indicate the nature of the invention whereas the scope of the invention is defined by the following claim.

I claim:

The method of incorporating diphenyl mercury as a bacteriostatic and fungistatic agent in a textile product which comprises the steps of applying to said textile product an aqueous solution containing the reaction product of a phenyl mercury salt and triethanolamine and thereafter decomposing the resulting reaction product by heating to a temperature not exceeding about 350° F. to produce diphenyl mercury in situ in the textile product.

FRANK J. SOWA.

(References on following page)

REFERENCES CITED

The following references are of record in the file of this patent:

UNITED STATES PATENTS

| Number | Name | Date |
|---|---|---|
| 2,040,806 | Feigl | May 12, 1936 |
| 2,250,345 | Allison | July 22, 1941 |
| 2,241,829 | Six et al. | May 13, 1941 |
| 1,947,519 | Carter | Feb. 20, 1932 |
| 2,129,376 | Kharasch | Sept. 6, 1938 |
| 2,411,815 | Sowa | Nov. 26, 1946 |

FOREIGN PATENTS

| Number | Country | Date |
|---|---|---|
| 537,512 | Germany | Nov. 4, 1931 |